United States Patent
Marche et al.

(10) Patent No.: US 12,307,294 B2
(45) Date of Patent: May 20, 2025

(54) PARTITIONING AND PLACEMENT OF MODELS OF MODELS AT A NETWORK EDGE

(71) Applicant: Cisco Technology, Inc., San Jose, CA (US)

(72) Inventors: Leo Marche, Le Pin (FR); Thomas Michel-Ange Feltin, Paris (FR); Andre Surcouf, Val d'Oise (FR); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 675 days.

(21) Appl. No.: 17/578,872

(22) Filed: Jan. 19, 2022

(65) Prior Publication Data

US 2023/0053575 A1 Feb. 23, 2023

Related U.S. Application Data

(60) Provisional application No. 63/234,595, filed on Aug. 18, 2021.

(51) Int. Cl.
*G06F 9/50* (2006.01)
*G06N 3/08* (2023.01)

(52) U.S. Cl.
CPC ............ *G06F 9/5027* (2013.01); *G06N 3/08* (2013.01); *G06F 2209/501* (2013.01); *G06F 2209/5017* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 5,704,012 | A | * 12/1997 | Bigus | G06F 9/5011 706/19 |
| 11,476,869 | B2 | * 10/2022 | Ambardekar | G06F 12/08 |
| 11,620,516 | B2 | * 4/2023 | Loh | G06N 3/045 706/20 |
| 11,663,444 | B2 | * 5/2023 | Wagner | G06N 3/084 706/15 |
| 2019/0155620 | A1 | 5/2019 | Arunachalam et al. | |
| 2019/0266015 | A1 | 8/2019 | Chandra et al. | |
| 2020/0380357 | A1 | * 12/2020 | Yao | G06N 3/08 |
| 2020/0409757 | A1 | 12/2020 | McBride et al. | |
| 2021/0097366 | A1 | * 4/2021 | Wagner | G06F 40/20 |
| 2021/0208943 | A1 | 7/2021 | Baughman et al. | |
| 2021/0264274 | A1 | * 8/2021 | Kellerman | G06N 3/084 |
| 2022/0141026 | A1 | * 5/2022 | Smith | H04L 9/0891 713/181 |
| 2022/0351020 | A1 | * 11/2022 | Yin | G06N 3/044 |

FOREIGN PATENT DOCUMENTS

EP 3367310 A1 8/2018

* cited by examiner

Primary Examiner — Van H Nguyen
(74) Attorney, Agent, or Firm — Lee & Hayes, P.C.

(57) ABSTRACT

Techniques and mechanisms are described for enabling a user to run heavy deep learning workloads on standard edge networks without off-loading computation to a cloud, leveraging the available edge computing resources, and efficiently partitioning and distributing a Deep Neural Network (DNN) over a network. The techniques enable the user to split a workload into multiple parts and process the workload on a set of smaller, less capable compute nodes in a distributed manner, without compromising on performance, and while meeting a Service Level Objective (SLO).

20 Claims, 6 Drawing Sheets

PARTITIONING AND PLACEMENT OF MODELS OF MODELS AT A NETWORK EDGE

CROSS REFERENCE TO RELATED APPLICATIONS

This application claims priority to U.S. Provisional Patent Application No. 63/234,595, filed Aug. 18, 2021, the entire contents of which are incorporated herein by reference.

TECHNICAL FIELD

The present disclosure relates generally to the field of computer networking, and more particularly to efficiently partitioning and distributing a deep neural network to edge device(s) and/or cloud device(s) in a network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In recent years, a rapidly growing number of new applications integrate a cloud-offloaded processing. Traditionally, "cloud" refers to remote cloud, a cloud placed in a datacenter and connected to the users through the core infrastructure of the internet. One advantage of remote clouds is their near-infinite compute power capacity. Accordingly, cloud-offloaded applications are different from classical standalone applications by the fact that a part of their processing is done remotely in a cloud. However, the location of remote clouds are usually really far from the users and the data-sources and access paths of the cloud is also out of control for the user. Moreover, cloud offloading may cause high latency, high jitter, high error rate, low available bandwidth, intermittent connectivity, GRPD and legal issues that are incompatible with some emerging applications (e.g., remote medical surgery, offloaded automated driving or real-time detection).

One proposed solution is edge offloading. The idea is to use multiple machines deployed at the edges of a network which can run part of the application components. These edge devices (e.g., sensors, microphones, cameras, user generated data, etc.) can be located close to sensors or users (for example, some cameras have an integrated Tensors Processing Unit (TPU) to run detection neural networks directly after the sensor) or can be located further away (e.g., on the same LAN or the same access network (in cases of mobile networks for example)). Currently, most deep learning applications that run on edge devices are composed of a monolithic pre-trained Deep Neural Network (DNN) which runs inference on data generated at the edge devices. However, most DNNs are often too heavy to run on the edge devices, such that a vast majority of deep learning-based applications are run on remote clouds. In the case of real-time or latency-sensitive applications, or in cases where policy compliance forbids data from leaving the edge devices, off-loading inference to the remote cloud is not an option. In these situations, the only option available to customers today is to buy additional dedicated hardware (GPUs, TPUs, etc.) at which to run the DNN, which can be expensive, time consuming, and requires the user to provide significant engineering effort. Therefore, a need exists for systems and methods of enabling users to run heavy deep learning workloads on standard edge devices without off-loading computation to a remote cloud.

Moreover, current edge offloading techniques focus on reducing overall end to end latency within a network. However, these techniques do not take into account computing resources of edge devices or focus on optimizing throughput of the DNN. Accordingly, there exists a need for systems and methods of optimizing throughput of DNNs on edge devices within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
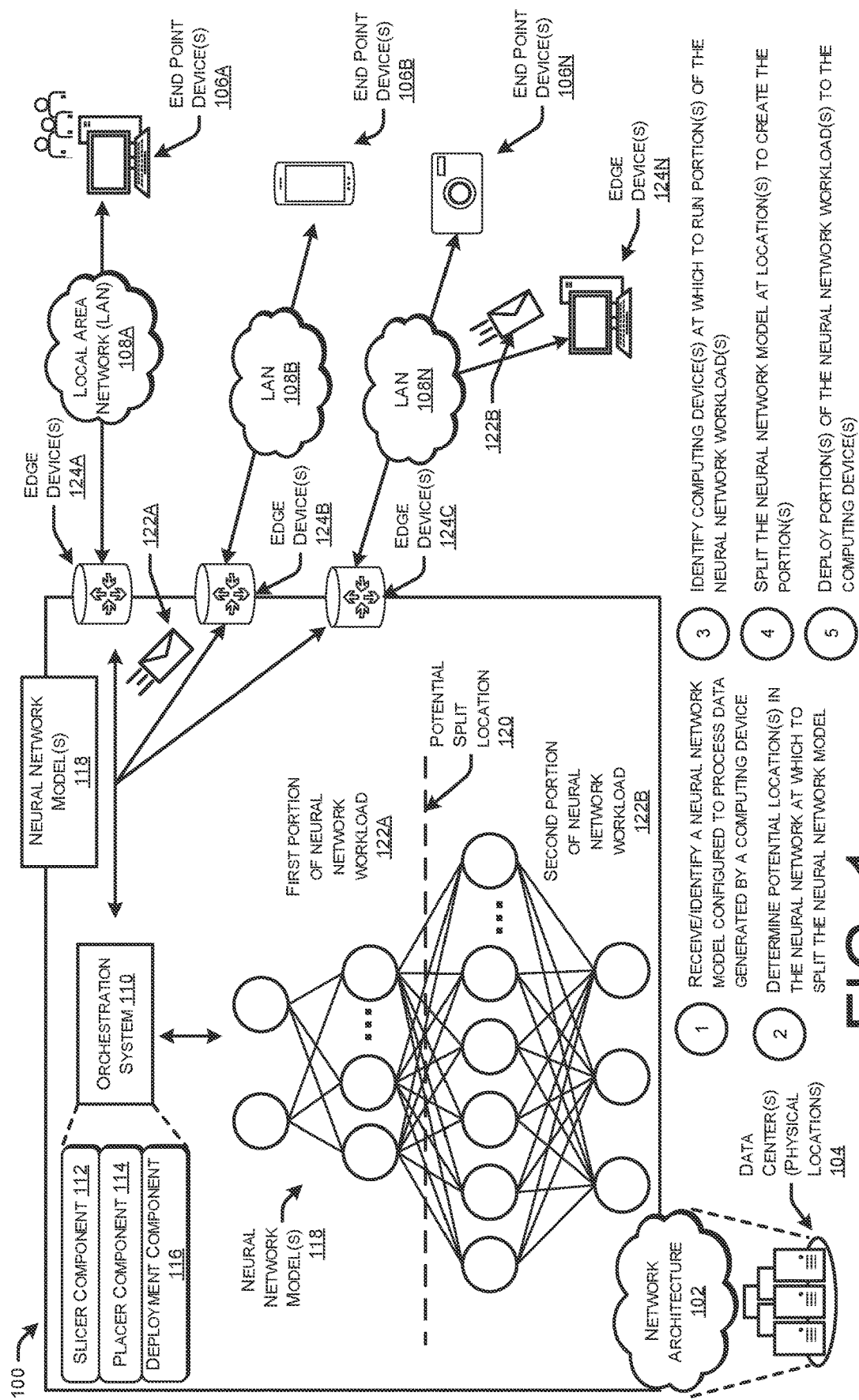
FIG. 1 illustrates a system-architecture diagram of an environment in which an orchestration system can efficiently partition and distribute a neural network model to edge device(s) in a network.

The present disclosure relates generally to the field of computer networking, and more particularly to efficiently partitioning and distributing a deep neural network to edge device(s) in a network without offloading computation to a cloud.

A method to perform techniques described herein may be implemented by an orchestration system and may include identifying a neural network model configured to process data generated by a computing device in a network. The method may further include analyzing the neural network model to determine a location in the neural network model at which to split the neural network model, identifying a first computing device in the network at which to run a first workload associated with a first portion of the neural network model and identifying a second computing device in the network at which to run a second workload associated with a second portion of the neural network model. The method may also include splitting the neural network model at the location, deploying the first workload to the first computing device, and deploying the second workload to the second computing device.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide-area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In recent years, a rapidly growing number of new applications integrate a cloud-offloaded processing. Traditionally, "cloud" refers to remote cloud, a cloud placed in a datacenter and connected to the users through the core infrastructure of the internet. One advantage of remote clouds is their near-infinite compute power capacity. Accordingly, cloud-offloaded applications are different from classical standalone applications by the fact that a part of their processing is done remotely in a cloud. However, the location of remote clouds are usually really far from the users and the data-sources and access paths of the cloud is also out of control for the user. Moreover, cloud offloading may cause high latency, high jitter, high error rate, low available bandwidth, intermittent connectivity, GRPD and legal issues that are incompatible with some emerging applications (e.g., remote medical surgery, offloaded automated driving or real-time detection).

One proposed solution is edge offloading. The idea is to use multiple machines deployed at the edges of a network which can run part of the application components. These edge devices (e.g., sensors, microphones, cameras, user generated data, etc.) can be located close to sensors or users (for example, some cameras have an integrated Tensors Processing Unit (TPU) to run detection neural networks directly after the sensor) or can be located further away (e.g., on the same LAN or the same access network (in cases of mobile networks for example)). Currently, most deep learning applications that run on edge devices are composed of a monolithic pre-trained Deep Neural Network (DNN) which runs inference on data generated at the edge devices. However, most DNNs are often too heavy to run on the edge devices, such that a vast majority of deep learning-based applications are run on remote clouds. In the case of real-time or latency-sensitive applications, or in cases where policy compliance forbids data from leaving the edge devices, off-loading inference to the remote cloud is not an option. For instance, an artificial intelligence model for detecting movement may run on an edge device (e.g., such as a smart camera). However, the smart camera may not have a large processing power (e.g., is processing 1-2 frames per second). Accordingly, if an object in front of the smart camera moves quickly enough, the smart camera may miss the object. In some cases, a user may need to be sure that the object is detected (e.g., such as for security purposes, etc.). In these situations, the only option available to customers today is to buy additional dedicated hardware (GPUs, TPUs, etc.) at which to run the DNN, which can be expensive, time consuming, and requires the user to provide significant engineering effort. Therefore, a need exists for systems and methods of enabling users to run heavy deep learning workloads on standard edge devices without off-loading computation to a remote cloud.

Moreover, current edge offloading techniques focus on reducing overall end to end latency within a network. However, these techniques do not take into account computing resources of edge devices or focus on optimizing throughput of the DNN. Accordingly, there exists a need for systems and methods of optimizing throughput of DNNs on edge devices within a network.

This disclosure describes techniques and mechanisms for enabling an orchestration system to efficiently partition and distribute a deep neural network to edge device(s) and/or cloud device(s) in a network. In some examples, the orchestration system may identify a neural network model configured to process data generated by a computing device in a network. In some examples, the orchestration system may receive a neural network model from the computing device. In some examples, the orchestration system may analyze the neural network model to determine a location in the neural network model at which to split the neural network model. The orchestration system may identify a first computing device in the network at which to run a first workload associated with a first portion of the neural network model and identify a second computing device in the network at which to run a second workload associated with a second portion of the neural network model. In some examples, the orchestration system may split the neural network model at the location, deploy the first workload to the first computing device, and deploy the second workload to the second computing device.

In some examples, the orchestration system comprises a slicer component. The slicer component may be configured to receive the neural network model as input and output an application graph. In some examples, the slicer component may identify one or more potential split location(s) between one or more layers of the neural network model.

In some examples, the orchestration system comprises a placer component. In some examples, the placer component is configured to determine optimized placement for portion(s) of the neural network workload. For instance, the placer component may identify a first computing device in the network as optimal to run a first portion of the neural network workload. In some examples, the placer component identifies the first computing device based on determining that one or more of (i) an amount of central processing unit (CPU) available on the first computing device is sufficient to support the first portion; (ii) an amount of bandwidth available to the first computing device is sufficient to both receive the first portion and support processing of the first portion; (iii) a processor type associated with the first computing device is optimized for running the first portion; and/or (iv) a device type associated with eh first computing device is optimized for running the first portion. In some examples, the placement component determines the optimized placement for the portion(s) of the neural network workload based on one or more of network topology, compute capabilities of the computing device(s), and/or the application graph.

In some examples, the orchestration system comprises a deployment component. The deployment component may be configured to receive the optimal placement as input and, based on the optimal placement, package and deploy each individual portion of the neural network workload to each respective computing device.

In some examples, the orchestration system comprises a monitoring component. In some examples, the monitoring component is configured to maintain list(s) associated with computing device(s) associated with where portion(s) of neural network model(s) are deployed. In some examples, the monitoring component monitors each computing device within the network. In some examples, monitoring component may detect the occurrence of an event. For instance, the monitoring component may detect a CPU overload event for a first computing device that receiving a first portion of a neural network workload. In this example, the monitoring component may alert and/or cause the placer component to identify an updated optimal placement for the first portion and the deployment component to re-package and re-deploy the first portion to the new computing device.

In some examples, the neural network model comprises a pre-trained model and/or pre-trained weighted model. In some examples, the neural network model is pre-trained using machine learning techniques. In some examples, the orchestration system stores machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.

As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

As used herein, the terms "workload," "neural network workload," and their equivalents may refer to a neural network model, a deep learning neural network model and/or an artificial intelligence model. As used herein, the terms "portion of the neural network workload," "portion(s) of the neural network workload(s)," and their equivalents, may refer to a portion of the neural network model and/or deep learning neural network model. For instance, the portion of the neural network model may correspond to a single layer of the neural network model and/or multiple layers of the neural network model.

In this way, an orchestration system can optimally split a neural network model into several pieces, with each piece small enough to fit available compute resources at the edge without compromising on the performance while providing better data security. Additionally, the orchestration system described herein may not only optimize use of available computing resources of edge devices, but also provide optimal throughput of the neural network model. Moreover, by implementing the orchestration system described herein, users are enabled to split heavy neural network workloads into multiple parts, enabling the user to process the workload on a set of smaller, less capable compute nodes in a distributed manner without compromising on the performance while meeting service level objectives (SLO). By optimizing throughput of the neural network model and providing improved data security, a user may run a large and comprehensive AI model at the edge without the need to invest into additional, dedicated hardware, thereby decreasing costs associated with the system.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 in which an orchestration system 110 optimizes throughput of a neural network. For instance, the neural network may comprise a deep learning neural network (DNN) model.

In some examples, the environment 100 may include a network architecture 102 that includes devices housed or located in one or more data centers 104. The network architecture 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area. Networks (WANs)— both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding network architectures 102 may not be located in explicitly defined data centers 104, but may be located in other locations or buildings.

In some instances, the orchestration system 110 comprises a network device and is included as part of a network architecture 102. The network architecture 102 may generally include, manage, or otherwise be associated with one or more applications or services utilized by users accessing network(s). Network(s) may comprise any combination of any combination of Personal Area Networks (PANs), Local Area Networks (LANs), Campus Area Networks (CANS), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. The network architecture 102 may provide any type of application or service for use by users of client devices (not shown). However, in other instances the orchestration system 110 may be associated with any type of computing device and be used for any purpose. In some examples, orchestration system 110 comprises a router, a switch, or any other type of device included in a network architecture.

As illustrated the orchestration system 110 includes a slicer component 112, a placer component 114, and a deployment component 116. In some examples, the slicer component 112 may be configured to receive a pre-trained neural network model and/or a pre-trained weighted neural network model as an input and output an application graph. As described in greater detail with regard to FIG. 3 below, the slicer component 112 may output an application graph that identifies split point(s) (e.g., points where the neural network model may be split and/or sliced into the smallest possible entity) in the topology of the neural network model. In some examples, the placer component 114 may be configured to identify optimized placement of workload portion(s) at edge device(s) 124 to optimize inference throughput (or framerate) of the neural network model. In some examples, the deployment component 116 may be configured to package each individual portion of the neural network model and deploy each individual portion over the network(s).

As illustrated, the system includes end point device(s) 106 and edge device(s) 124. In some examples, end point device(s) 106 comprise computing device(s), such as user device(s) (e.g., computers, mobile devices, cameras, etc.) that collect data. For instance, in some examples, the end point device 106 may comprise a smart camera. The edge device(s) 124 may process the data collected by the end point devices and may comprise any computing device, network device (e.g., routers, switches, servers, etc.), sensors, microphones, smart cameras, user generated data, or any other device with processing capabilities. In some examples, the edge device(s) (e.g., edge device(s) 124A-124C) are included on the edge of the internet service provider network. In the illustrative example, edge devices 124A-124C are included as part of the network architecture 102. Additionally or alternatively, the edge device(s) 124 may be part of a user's local network, such as edge device 124N and may receive the data via the LAN 108N. For instance, edge device 124 may be included as part of a user's LAN 108N. While the illustrative example shows a user's local network as being a LAN 108, the local network 108 may comprise any local network, such as a PAN, CAN, MAN, and/or WAN.

As illustrated, the orchestration system 110 may receive neural network model(s) 118 from the edge device(s) 124. As noted above, the neural network model(s) 118 may comprise deep learning neural network (DNN) models. As illustrated in FIG. 1, the neural network model(s) 118 may comprise multiple layers, such as an input layer, hidden layer(s), and an output layer. For instance, the neural network model(s) 118 receive an input (e.g., a vector) at the input layer and transforms the input by performing operations via the hidden layers. An individual hidden layer may include multiple "neurons," each of which may be disconnected from other neurons in the layer, An individual neuron within a particular layer may be connected to multiple (e.g., all) of the neurons in the previous layer. As illustrated, the neural network model(s) 118 may further include at least one fully-connected layer (e.g., the output layer) that receives a feature map output by the hidden layers and transforms the feature map into the output of the neural network model 118. In some examples, the neural network model(s) 118 comprise a more complex DNN architecture. For instance, the neural network model(s) 118 may comprise a SqueezeNet, YOLO, or any other suitable DNN or neural network architecture.

At "1", the orchestration system 110 may receive and/or identify a neural network model configured to process data generated by a computing device. In some examples, the orchestration system 110 may receive the neural network model 118 from an edge device 124. In some examples, the orchestration system 110 may identify a neural network model 118 within the network architecture 102. In some examples, the neural network model 118 comprises a pre-trained model and/or a pre-trained weighted model. In some examples, the neural network model 118 is pre-trained using machine learning technique(s) described above. For instance, the orchestration system 110 may receive the neural network model 118 from an edge device 124, such as a smart camera. In this example, the neural network model 118 comprises an artificial intelligence model for detecting movement in front of the smart camera. As described above, the edge device 124 may not have a large processing power. For instance, the edge device 124 may be configured to process 1-2 frames per second. Accordingly, if an object in front of the smart camera moves quickly enough, the smart camera may miss the object. In some examples, the orchestration system 110 may identify a network topology and/or device capabilities of device(s) within the network.

At "2", the orchestration system 110 may determine potential location(s) in the neural network at which to split the neural network model 118. For instance, the orchestration system 110 may generate an application graph based on the neural network model 118. In some examples and as described in greater detail below, the slicer component 112 transforms the neural network model 118 into the application graph. As noted above, the application graph may identify potential split location(s) 120 in the topology of the neural network model 118.

At "3", the orchestration system 110 may identify edge device(s) 124 at which to run portion(s) of the neural network workload(s). In some examples, a first portion of the neural network workload corresponds to a first portion of the neural network model 118.

At "4", the orchestration system 110 may split the neural network model at the location s) to create the portion(s), In some examples, the location corresponds to the potential split location 120. In some examples, splitting the neural network model 118 creates and/or generates a first portion of the neural network workload 122A and a second portion of the neural network workload 122B. For instance, as described in greater detail below, the deployment component 116 may package portion(s) of the neural network workload(s). In some examples, the deployment container packages the workload portion(s) based on the output of the placer component 114.

At "5", the orchestration system 110 may deploy portions) of the neural network workload(s) 128 to the edge device(s) 124. For instance, the deployment component 116 may deploy the packaged containers to the edge device(s) 124. In some examples, each container is deployed and started on the LAN 108 using an execution model (e.g., Kubernetes, Virtual Machines, or any other appropriate execution model). In some examples, and as illustrated in FIG. 1, a first portion of the neural network workload 122A may be deployed to a first edge device 124B for processing. For instance, the first edge device 124B may be included as part of the edge of the network architecture 102. In some examples, and as illustrated in FIG. 1, a second portion of the neural network workload 122B may be deployed to a second edge device 124N. For instance, the second edge device may be included as part of a user's local network 108.

Figure 2:
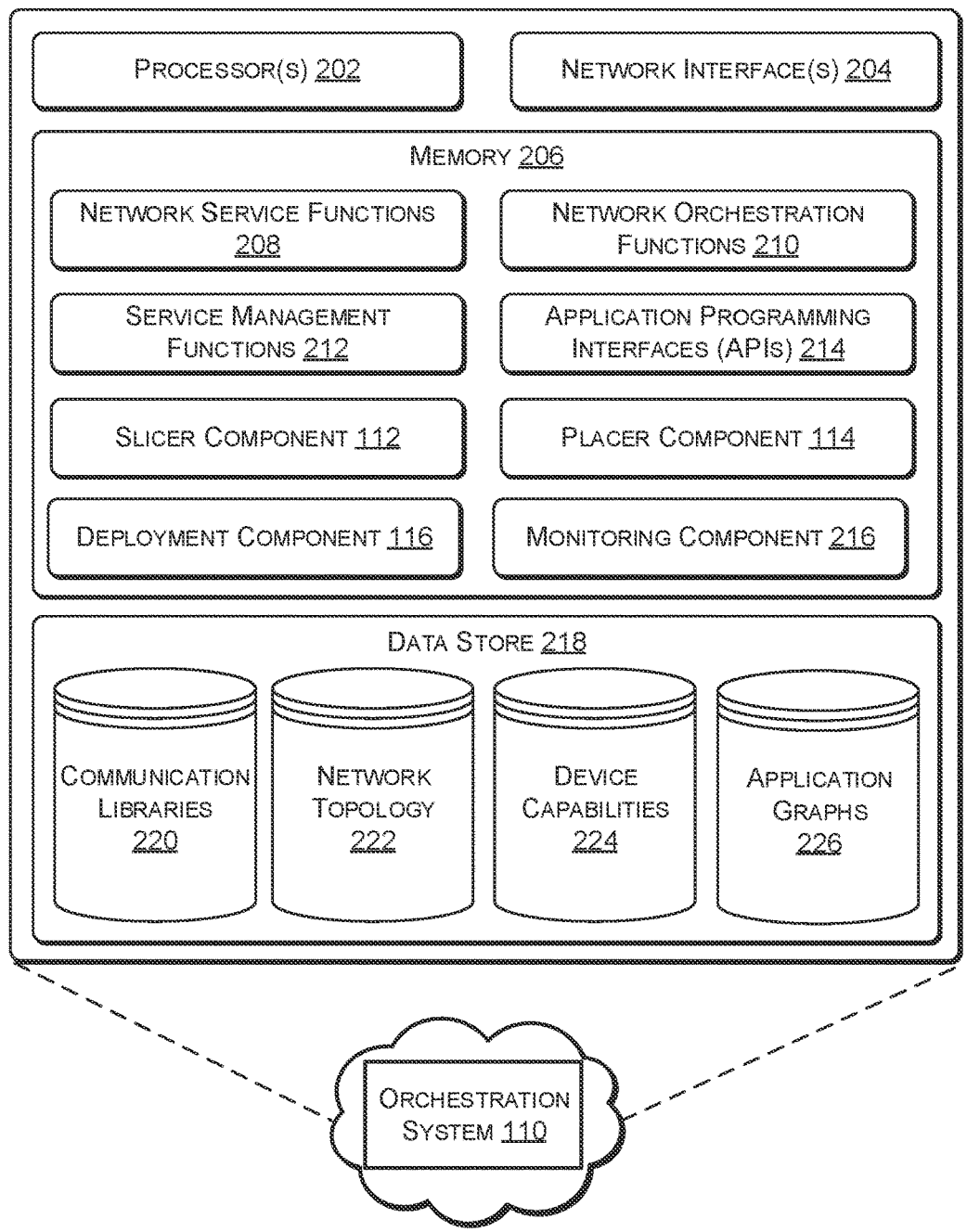
FIG. 2 illustrates a component diagram of an example orchestration system described in FIG. 1.

FIG. 2 illustrates a component diagram of an example orchestration system that receives or identifies neural network models, partition a DNN workload, and determines location(s) in a network architecture at which to deploy portion(s) of the DNN workload. In some instances, the orchestration system 110 may run on one or more computing devices in, or associated with, the network architecture 102 (e.g., a single device or a system of devices). The orchestration system 110 may comprise a single controller that is running, or multiple instances of a network controller running at least partly at a same time.

Generally, the orchestration system 110 may include a programmable controller that manages some or all of the control plane activities of the network architecture 102, and manages or monitors the network state using one or more centralized control models. Generally, the orchestration system 110 may handle at least the functions of (i) receiving and/or identifying a neural network model 118, (ii) determining location(s) at which to split the neural network model, (iii) identifying edge device(s) 124 in the network that are optimized to process portion(s) of the workload(s) of the neural network model 118, (iv) splitting the neural network model 118, and (v) deploying portion(s) of the workload(s) to the computing device(s) that are optimized to run the portion(s) of the neural network model 118.

As illustrated, the orchestration system 110 may include, or run on, one or more hardware processors 202 (processors), one or more devices, configured to execute one or more stored instructions. The processor(s) 202 may comprise one or more cores. Further, the orchestration system 110 may include or be associated with (e.g., communicatively coupled to) one or more network interfaces 204 configured to provide communications with the edge device(s) 124 and other devices, and/or other systems or devices in the network architecture 102 and/or remote from the network architecture 102. The network interfaces 204 may include devices configured to couple to personal area networks (PANs), wired and wireless local area networks (LANs), wired and wireless wide area networks (WANs), and so forth. For example, the network interfaces 204 may include devices compatible with any networking protocol.

The orchestration system 110 may also include memory 206, such as computer-readable media, that stores various executable components (e.g., software-based components, firmware-based components, etc.). The memory 206 may generally store components to implement functionality described herein as being performed by the orchestration system 110. The memory 206 may store one or more network service functions 208, such as a slicing manager, a topology manager to manage a topology of the network architecture 102, a host tracker to track what network components are hosting which programs or software, a switch manager to manage switches of the network architecture 102, a process manager, and/or any other type of function performed by the orchestration system 110.

The orchestration system 110 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network architecture 102 (configurable), and one or more APIs 214 for communicating with devices in the network architecture 102 and causing various control plane functions to occur.

Further, the orchestration system 110 may include a slicer component 112 that is configured to receive a pre-trained neural network model and/or a pre-trained weighted neural network model as an input and output an application graph. As noted above, the application graph may identify split point(s) (e.g., points where the neural network model may be split and/or sliced into the smallest possible entity) in the topology of the neural network model. In some examples, the placer component 114 may be configured to identify optimized placement of workload portion(s) at edge device(s) 124 to optimize inference throughput (or framerate) of the neural network model. The orchestration system 110 may further include a placer component 114. As described in more detail in FIG. 4, the placer component 114 may be configured to identify optimized placement of workload portion(s) at edge device(s) 124 to optimize inference throughput (or framerate) of the neural network model. The orchestrations system 110 may include a deployment component 116. As noted above and described in greater detail below, the deployment component 116 may be configured to package each individual portion of the neural network model and deploy each individual portion over the network(s) and/or local network(s) 108.

The orchestration system 110 may further include a monitoring component 216 that is configured to monitor the edge device(s) 124 and detect if one or more conditions (e.g., a node goes down, a node loses connection to the network and/or local network 108, there is a change in bandwidth available to a node, there is a change in an amount of CPU available to a node such that performance of the node is degrading) of the network and/or local network 108 changes. For instance, the monitoring component 216 may detect that a node (e.g., an edge device 124) within the LAN 108 has a change in the amount of CPU available to the node, such that performance of the node is degrading such as CPU overload). In this example, the monitoring component 216 may determine whether a portion of the neural network workload was sent to that node. In some examples, the monitoring component 216 stores list(s) indicating which portion(s) of the neural network workload(s) are sent to each edge device 124. If a portion of the workload was sent to that node, the monitoring component 216 may cause the placer component 114 to re-calculate optimized placement for at least the portion of the workload. In some examples, the placer component 114 may re-calculate optimized placement for each portion of the neural network model 118. The deployment component 116 may re-deploy the portion(s) of the workload(s) based on the updated optimized placements. In some examples, the placement component 114 and the deployment component 116 re-calculates and re-deploys the portion(s) of the workload(s) dynamically and in near real-time. In some examples, the monitoring component 216 may update the list(s) to indicate the updated optimized placement of workload(s).

The orchestration system 110 may further include a data store 218, such as long-term storage, that stores communication libraries 220 for the different communication protocols that the orchestration system 110 is configured to use or perform. Additionally, the data store 218 may include network topology data 222, such as a model representing the layout of the network components in the network architecture 102. The data store 218 may store device capabilities 224 that includes telemetry data indicating computing resource usage and/or availability on the different network components in the network architecture 102. The device capabilities may further include data indicating available bandwidth, available CPU, delay between nodes, computing capacity, processor architecture, processor type(s), etc. Additionally, the data store 218 may include application graphs 226. As described in greater detail below, application graphs 226 may be generated by the slicer component 112.

Figure 3:
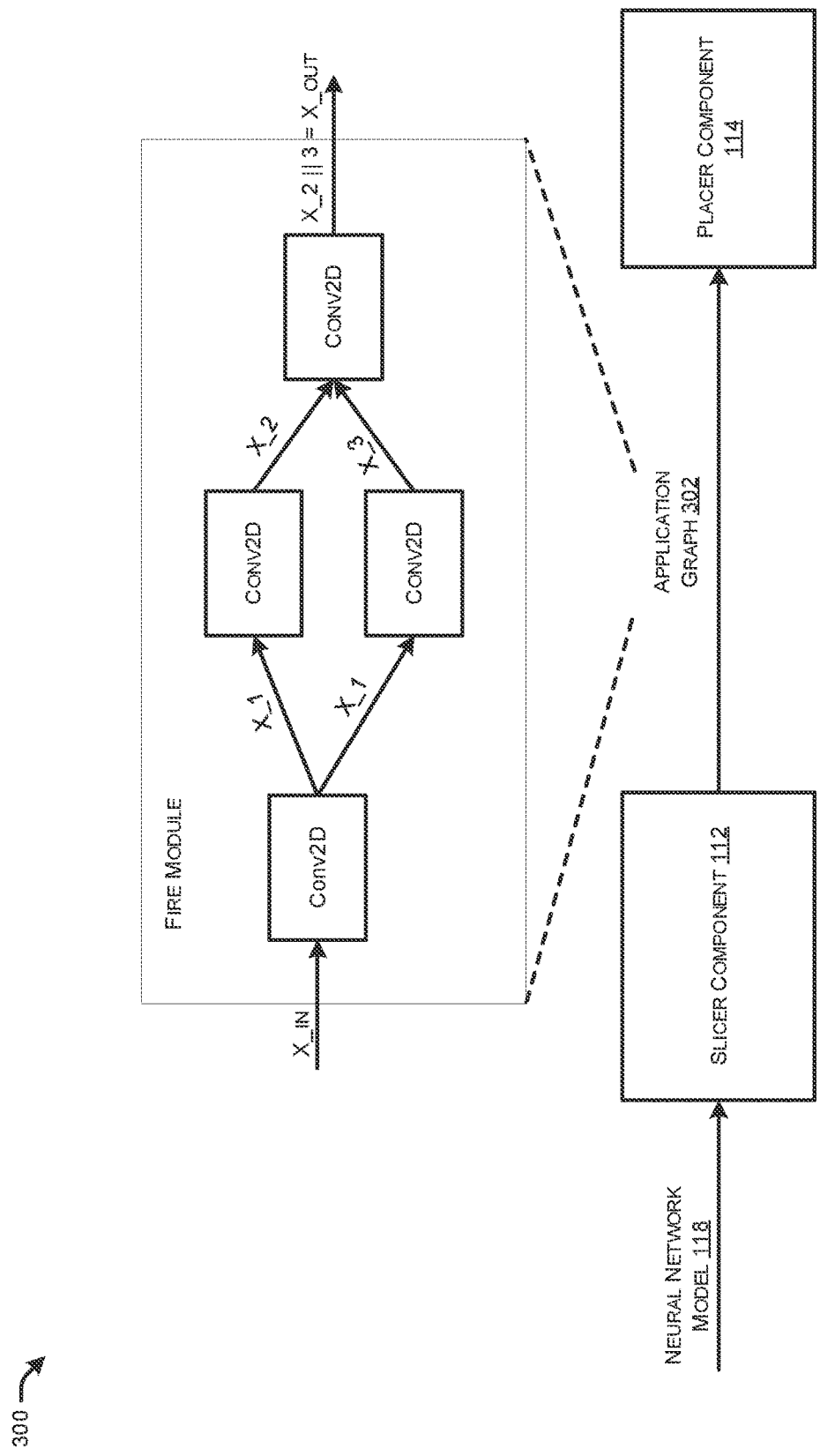
FIG. 3 illustrates a flow diagram of example input(s) and output(s) between the slicer component and the placer component of the orchestration system 110 of FIGS. 1 and 2.

FIG. 3 illustrates a flow diagram 300 of example input(s) and output(s) between the slicer component and the placer component of the orchestration system 110 of FIGS. 1 and 2. As illustrated, the slicer component 112 may receive a neural network model 118 as an input. In some examples, the neural network model 118 may comprise a pre-trained model (e.g., machine learning model and/or artificial intelligence model). In some examples, the neural network model 118 may comprise a weighted pre-trained model.

As noted above, the slicer component 112 may be configured to transform the network topology 222 of the neural network model 118 into an application graph 302. For instance, the slicer component 112 may partition the neural network model 118 into the application graph 302 by, identifying potential split location(s) in the neural network model 118. In some examples, the potential split location(s) comprise a smallest possible piece of the neural network model 118. Accordingly, the slicer component 112 may output the application graph 302, where the application graph 302 describes task(s) running sequentially. As an example, the neural network model 118 is a simple concatenation of layers, where each layer only takes as input the output of the previous layer. In this example, the application graph 302 output by the slicer component 112 may consist of N nodes, where N corresponds to the number of layers in the neural network model 118. In this example, the application graph 302 may indicate that the neural network model 118 may be split between every pair of nodes (e.g., N−1 split points). Accordingly, the split point(s) may comprise the smallest possible portion (e.g., a layer, discrete input, particular function, etc.) of the neural network model 118.

In the illustrative example, the application graph 302 corresponds to a SqueezeNet architecture. In this example, each input stage of each fire module sends its output to two individual layers which later send two different results to be concatenated and passed through to the next layer. SqueezeNet is made from the concatenation of such modules (e.g., fire modules and concatenated modules). In the illustrative example, the simplest split consists of a whole fire module being considered as one node and the application graph 302 indicating a split in between. Accordingly, the illustrated application graph 302 illustrates an example fire module as a possible split point. In some examples, the application graph 302 is weighted, where each arrow represents an amount of data (e.g., the size of data) that transits between the layer before and the layer after. As indicated above, the application graph 302 is output by the slicer component 112 and provided as input to the placer component 114. In some examples, the application graph 302 comprises a direct acyclic graph. For instance, a neural network model 118 (e.g., such as a DNN) of N layers can be modeled as a direct acyclic graph. As an example, the direct acyclic graph may comprise operations where $G_A=(L, E)$ with $L=(L_1, \ldots, L_N)$ corresponding to the layers of the neural network model 118. Edges $(L_i, L_j)E$ are the connections between layer $L_i$ and $L_j$ and every layer $L_i$ has an associated compute consumption $c_i$. The total cost of computing the whole neural network model 118 on one node is: C=sum ci. Edges $(L_i, L_j)$ are assigned a weight corresponding to the size of the data transiting between $L_i$ and $L_j$.

In some examples, the slicer component 112 may output an application graph 302 with no potential split location(s) identified. In this example, the slicer component 112 may determine, based at least in part on information associated with neural network model 118 (e.g., pre-trained machine learning and/or artificial intelligence model(s), weight(s), etc.) and based on internal rules of the slicer component 112, that no potential split within the neural network model 118 can simplify the neural network model 118 or that optimizing a potential split location may be too complex for the placer component 114. For instance, the application graph 302 may comprise a simplified version of the neural network model 118 that regroups layer(s) of the neural network model 118 into one or more largest layer groups (e.g., such as a fire layer in the SqueezeNet example described above) when there are no potential split location(s) between the layers.

Figure 4:
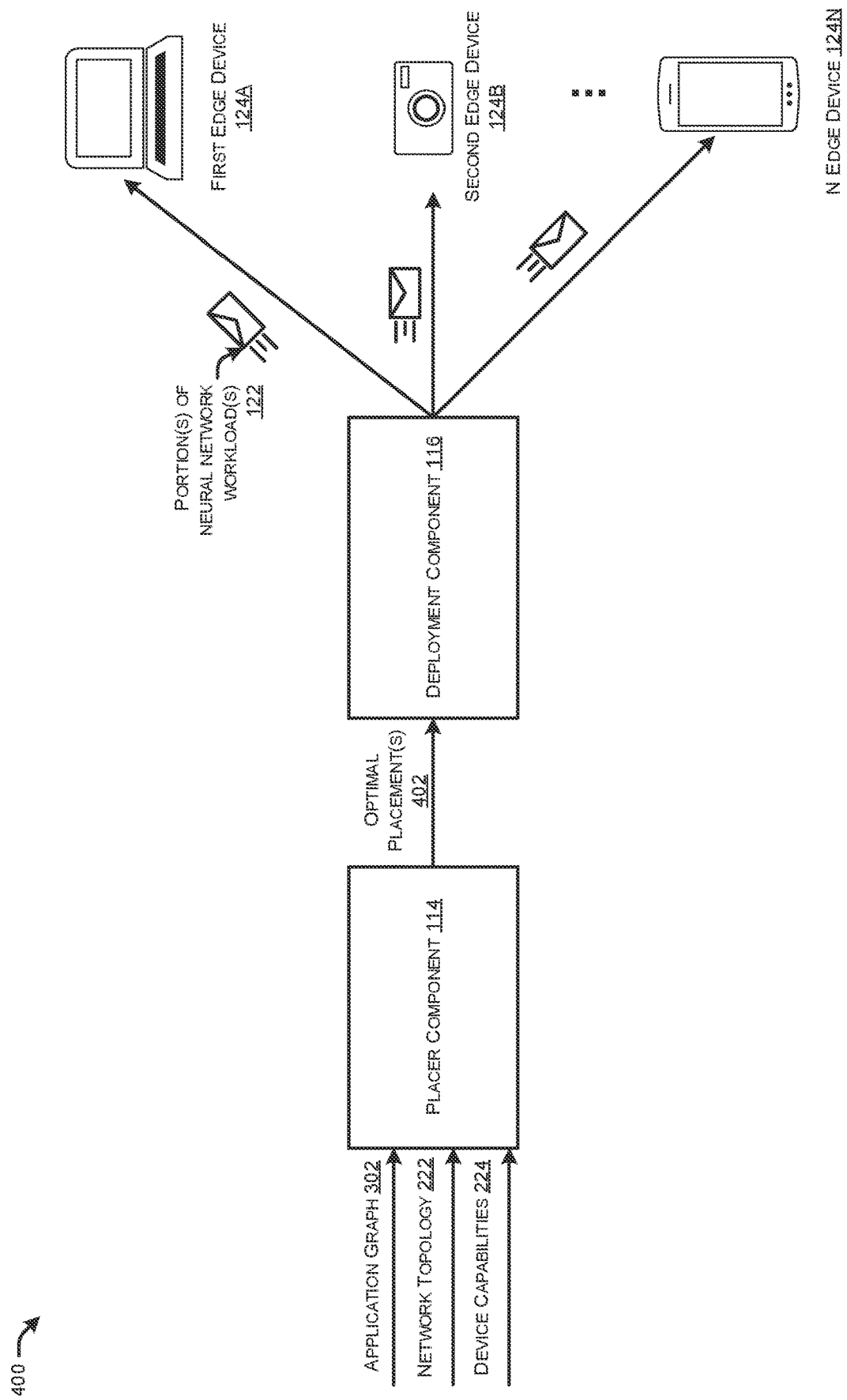
FIG. 4 illustrates a flow diagram of example input(s) and output(s) between the placer component and the deployment component of the orchestration system 110 of FIGS. 1 and 2.

FIG. 4 illustrates a flow diagram 400 of example input(s) and output(s) between the placer component 114 and the deployment component 116 of the orchestration system 110 of FIGS. 1 and 2. As illustrated the placer component 114 may receive application graph 302, described above, as input.

As illustrated, the placer component 114 may also receive device capabilities 224 and/or network topology 222 as input. In some examples, the network topology 222 comprises network topology information (e.g., bandwidth information, etc.) for a physical network (e.g., for edge device(s) 124 within LAN 108 and/or device(s) within the network architecture 102). In some examples, the device capabilities 224 comprises information associated with computing capacities for each node. For instance, the placer component 114 may receive information (e.g., such as device capabilities 224 and/or network topology 222) associated with computing capacity of the nodes within the network and/or local network 108, link bandwidth between node(s), topology (e.g., location(s)) of the nodes, computation time of the nodes, etc. In some examples, the device capabilities 224 and/or network topology 222 comprises a direct acyclic graph. As an example, the direct acyclic graph may comprise operations where $G_N=(N, B)$, with $N=(N_1, \ldots, N_M)$ corresponding to the set of compute nodes, with respective computing capacities $(k_1, \ldots, k_M)$. Link bandwidth between two adjacent nodes $N_p$ and $N_q$ is $b_{p,q}$ and every node $N_i$ is connected to itself with infinite bandwidth to represent the loopback link. In some examples, the physical network (e.g., edge device(s) 124 within LAN 108 and/or device(s) within the network architecture 102) can be considered as a fully connected graph. In the illustrative example, the edge device(s) 124 (e.g., nodes) comprise edge device(s) 124A, 124B, . . . , 124N.

In some examples, the placer component 114 may determine optimized placement for portion(s) of workload(s) of the neural network model 118 by running one or more simulations to find placement(s) that optimize inference throughput (or framerate), based on both the application graph 302 and the network topology (e.g., device capabilities 224).

For instance, the placer component 114 may determine optimized placement based on one or more factors, such as Single Layer Computation time (e.g., the time it takes for layer $L_i$ to compute on node $N_p$ with capacity $k_p$, is $T_i^c(N_p)=c_i/k_p$); Single Exchange Transmission time (e.g., the time it takes to send data between layers $L_i$ and $L_j$ on edge $(N_p, N_q)$ over link with bandwidth $b_{p,q}$ is $T_{i,j}^t(N_p, N_q)=s_{i,j}/b_{p,q}$); Delay (e.g., given a placement P: L→N, the total delay to compute one frame through the entire network sequentially is $T=\mathrm{sum}_i T_i^c(N_p)+\mathrm{sum}_{i,j} T_{i,j}^t(N_p, N_q)$); and/or Cadence (e.g., where the maximum achievable FPS will be the inverse of the maximum between all the different nodes (computation) and links (transmission) individual times $\mathrm{MAXFPS}(P, G_A, G_N)=1/\max(\{T^c(Ni)\}_i \cup \{T^t(N_p, N_q)\}_{p,q})$).

In some examples, the placer component. 114 may determine optimized placement with a placement matrix P. Let's define P the placement matrix such as P is of size (N×M) with N being the number of layers and M the number of nodes. For example, if N=5 layers and M=2 compute nodes, the placement with the first three layers on node 0 and the rest on node 1 may be represented as:

$$P = \begin{pmatrix} 1 & 1 & 1 & 0 & 0 \\ 0 & 0 & 0 & 1 & 1 \end{pmatrix}$$

In this example, given P, the node computation times can be expressed as a single vector $T^c$ of size N where the i-th component is the node computation time of node $N_i$, i.e., $T_i^c=T^c(N_i)$ for $T^c=KPc$, where $K=\mathrm{diag}(k_0^{-1}, \ldots, k_m^{-1})$ and c is the column vector $(c_0, \ldots, c_n)$.

In some examples, the placer component 114 may determine transmission time by computing matrix $T^t$ as $T^t=PSP^t \circ B$, where $\circ$ is the term-by-term product, or Hadamard product. In this example, B is a square matrix of size (M×M) with $B=b_{ij}^{-1}$ and $$S = \begin{pmatrix} 0 & S_{1,2} & 0 & \ldots & 0 \\ 0 & 0 & S_{2,3} & \ddots & \vdots \\ \vdots & & \ddots & \ddots & 0 \\ \vdots & & & \ddots & S_{N-1,N} \\ 0 & \ldots & \ldots & \ldots & 0 \end{pmatrix}$$

In some examples, the placer component 114 is configured to minimize delay or maximize cadence (e.g., minimize the sum of all terms of T and S or minimize their maximum value) based on one or more service level objectives (SLOs). For instance, the neural network model 118 may comprise an artificial intelligence model for detecting movement may run on an edge device (e.g., such as a smart camera). In this example, the smart camera may not have a large processing power (e.g., is processing 1-2 frames per second). Accordingly, if an object in front of the smart camera moves quickly enough, the smart camera may miss the object. In some cases, a user may need to be sure that the object is detected (e.g., such as for security purposes, etc.). In this example, the placer component 114 may determine optimized placement for maximizing throughput, such that the smart camera may improve processing from 1-2 frames per second to 4 to 6 frames per second (or any other improved processing speed (e.g., 13 frames per second, etc.). In some examples, the placer component 114 determines optimized placement using a branch and bound method and/or any other suitable technique.

As illustrated, the placer component 114 may output optimal placement(s) 402, which the deployment component 116 receives as input. The optimal placement(s) 402 may indicate an optimal placement of the portion(s) of the workload(s) of the neural network model 118. In some examples, the optimal placement(s) 402 are determined based on one or more SLOB. For instance, continuing the example described above, the optimal placement(s) 402 may comprise placements within the network that maximize throughput of the network. For example, on a simple edge application (e.g., a SqueezeNet architecture deployed on a smart camera with limited computing capabilities (e.g., such as 4 frames per second) that is wired to a nearby edge node, and does not have hardware acceleration), the optimal placement(s) 402 may to improve the frames per second processing from 4 to 6 frames per second with standard link characteristics. In some examples, the optimal placement(s) 402 may provide improvements in throughput up to 3 times better (e.g., such as 13 frames per second) or more if the link bandwidth is increased. In some examples, the optimal placement(s) 402 indicate placement of a first portion of the workload at first edge device 124A, a second portion of the workload at second edge device 124B, . . . and Nth portion of the workload at Nth edge device 124N.

In some examples, the optimal placement(s) 402 are determined based at least in part on one or more of computing capacity of edge device(s), processor architecture, processing means, and/or individual connectivity means (e.g., available bandwidth and/or delay between nodes) for each edge device. For instance, the placer component 114 may determine optimized placement of a first portion of the workload for a neural network model 118 is at the first edge device 124A based at least in part on determining that an amount of CPU available to the first edge device 124A is sufficient to support processing of the first portion of the workload. Additionally, or alternatively, the placer component 114 may determine the optimized placement based at least in part on determining that an amount of bandwidth available to the first edge device 124A is sufficient to receive data associated with the first portion of the workload over the LAN 108 (or other local network) and support processing of the first portion of the workload. Additionally, or alternatively, the placer component 114 may determine optimized placement at the first edge device 124A based at least in part on a device type associated with the first edge device, processor type, processing means, etc. associated with the first edge device 124A. For instance, where the first portion of the workload corresponds to image processing, the placer component 114 may determine optimal placement at the first edge device 124A based on determining that the first edge device 124A has a graphics processor. In some examples, the placer component 114 may determine optimized placement at the first edge device 124A based at least in part on whether the first edge device 124A has acceleration features, an amount of GPU available to enhance performance, or other device capabilities.

As illustrated, the deployment component 116 receives the optimal placement(s) 402 as input. As noted above, the deployment component 116 may generate container(s) for each individual portion of the neural network model 118. For instance, for every computing device (e.g., node, edge device(s) 124) identified as part of the physical network (e.g., hardware parts and/or edge device(s) 124 in the LAN 108), the placer component 116 may build a container with the layer(s) identified as being placed at each respective node. For instance, for the first edge device 124A, the placer component 116 may take the layer(s) of the neural network model 118 identified as being placed at the first edge device 124A by the optimal placement(s) 402 and builds a container for the portion of the workload. In some examples, the container may be built using Python dependencies and may comprise TCP clients to communicate with the other nodes, an RTSP client if it needs to access the input video feed, and/or an MQTT client if it needs to export data to a broker.

As noted above, the deployment container 116 may deploy each individual portion of a neural network workload 128 associated with the neural network model 118 to the computing device(s) (e.g., edge device(s) 124) identified by the optimal placement(s) 402. In some examples, each individual container is deployed and started on the network and/or local network 108 using an execution model (e.g., Kubernetes, Virtual Machines, or any other suitable tool, container-based solution, controller-based solution, agent, etc.). As noted above, the deployment component 116 may deploy the portion(s) of the neural network workload(s) 128 to one or more edge device(s) 124. In some examples, the portion(s) of the neural network workload(s) 128 are deployed via network and/or local network 108.

Figure 5:
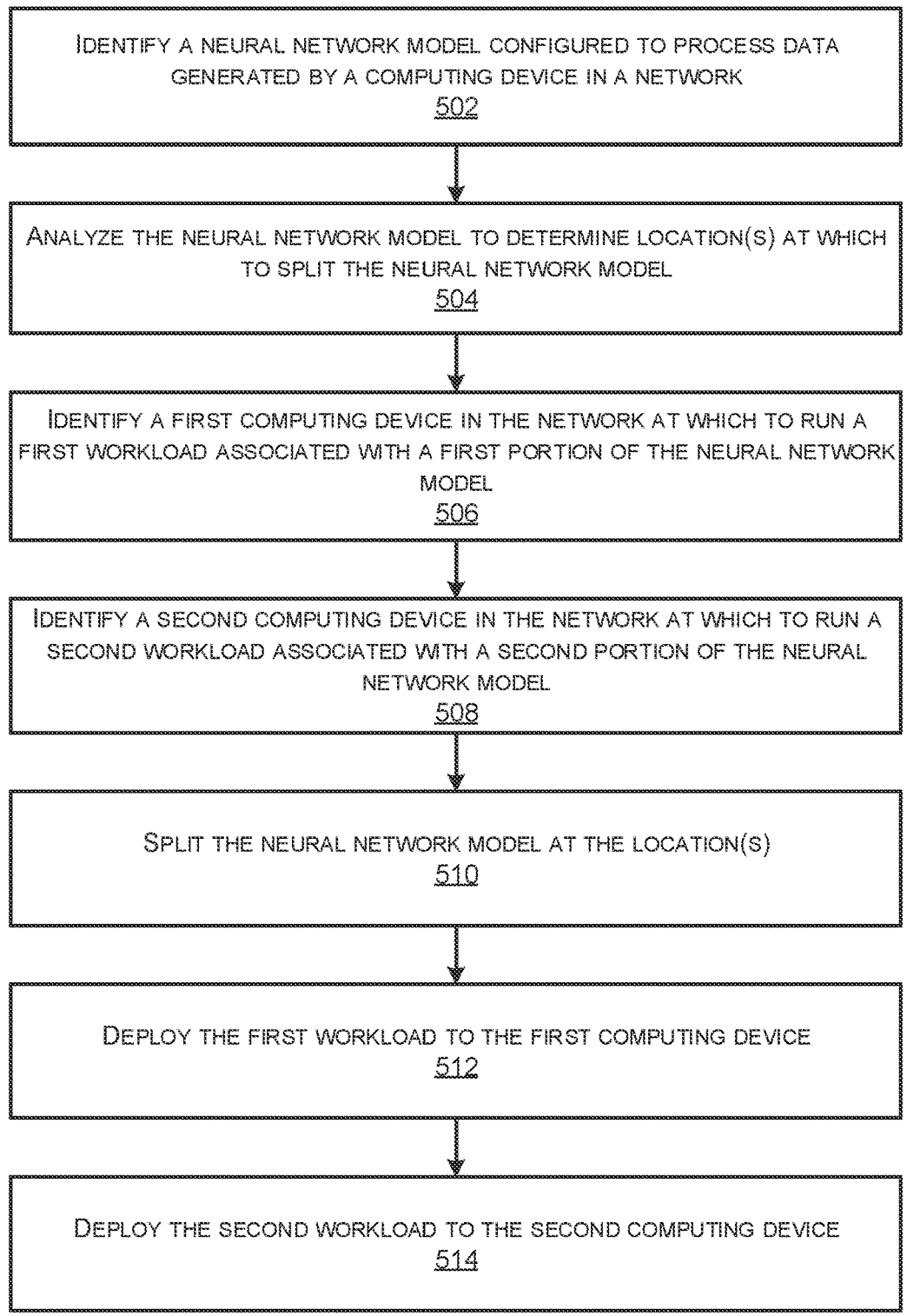
FIG. 5 illustrates a flow diagram of an example method for an orchestration system to efficiently partition and distribute a deep neural network to edge device(s) in a network

FIG. 5 a flow diagram of an example method 500 for an orchestration system to efficiently partition and distribute a deep neural network to edge device(s) in a network. In some instances, the steps of method 500 may be performed by a device (e.g., orchestration system 110) that includes one or more processors and one or more non-transitory computer-readable media storing computer-executable instructions that, when executed by the one or more processors, cause the one or more processors to perform operations of method 500.

At 502, the orchestration system 110 may identify a neural network model configured to process data generated by a computing device in a network. As noted above, in some examples, the orchestration system 110 may receive the neural network model from an edge device 124 in the network and/or local network 108. In some examples, the computing device may comprise an edge device 124. As noted above, the neural network model 118 may comprise a deep learning neural network model, such as a weighted, pre-trained model. As noted above, the edge device 124 may comprise any user device, network device, and/or computing device. In some examples, the orchestration system 110 may identify and/or access information associated with network topology and/or device capabilities of devices within the network.

At 504, the orchestration system 110 may analyze the neural network model 118 to determine a location in the neural network model at which to split the neural network model 118. For instance, the orchestration system 110 may determine a location (e.g., a potential split location 120) using the split component 112 described above. In some examples, the orchestration system 110 may identify no potential split location(s). In some examples, the orchestration system may identify a plurality of potential split locations. As noted above, the orchestration system 110 may determine the location by identifying a potential split location between one or more layers of the neural network model.

At 506, the orchestration system 110 may identify a first computing device at which to run a first workload associated with a first portion of the neural network model. For instance, the first computing device may correspond to first edge device 124A described above. As noted above, the first computing device may be part of the network or part of a user's local network. In some examples, the orchestration system 110 identifies the first computing device using the placer component 114 described above. As noted above, the first computing device may be identified based at least in part on using information associated with the network topology and/or device capabilities. For instance, the first computing device may be identified based on determining that an amount of central processing unit (CPU) available on the first computing device is sufficient to support the first workload and/or determining that an amount of bandwidth available to the first computing device is sufficient to receive data over the network to support the first workload. In some examples, the first computing device may be identified based at least in part on determining that a processor type or device type associated with the first computing device is optimized for running the first workload.

At 508, the orchestration system 110 may identify a second computing device in at which to run a second workload associated with a second portion of the neural network model. For instance, the second computing device may correspond to second edge device 124B described above. As noted above, the second computing device may be part of the network or part of a user's local network. In some examples, the orchestration system 110 identifies the second computing device using the placer component 114 described above. As noted above, the second computing device may be identified based at least in part on using information associated with the network topology and/or device capabilities. For instance, the second computing device may be identified based at least in part on one or more of (i) determining that an amount of central processing unit (CPU) available on the second computing device is sufficient to support the second workload, (ii) determining that an amount of bandwidth available to the second computing device is sufficient to receive data over the network to support the second workload, and/or (iii) determining that a processor type or device type associated with the second computing device is optimized for running the second workload.

At 510, the orchestration system 110 may split the neural network model at the location. For instance, the orchestration system 110 may split the neural network model 118 using any of the slicer component 112, placer component, and/or deployment component 116 described above. In some examples, the orchestration system 110 splits the neural network model at a plurality of locations.

At 512, the orchestration system 110 may deploy the first workload to the first computing device. In some examples, the first workload corresponds to a first portion of the neural network workload 128 described above. For instance, the orchestration system 110 may package and deploy the first workload using the deployment component 116 described above.

At 514, the orchestration system 110 may deploy the second workload to the second computing device. In some examples, the second workload corresponds to a second portion of the neural network workload 128 described above. For instance, the orchestration system 110 may package and deploy the second workload using the deployment component 116 described above.

In some examples, and as noted above, the orchestration system 110 may determine, based at least partly on monitoring the first computing device, that an event occurs that results in a deteriorated performance of the first computing device. For instance, the event may comprise one of a CPU overload or a disconnect from the network. In some examples, the orchestration system 110 may, based at least in part on the event, identify a third computing device at which to run the first workload associated with the first portion of the neural network model and deploy the first workload to the third computing device. In some examples, identifying and deploying the first workload to the third device is dynamic and in response to detecting the event. In some examples, the orchestration system 110 continues to monitor the computing devices in the network.

Figure 6:
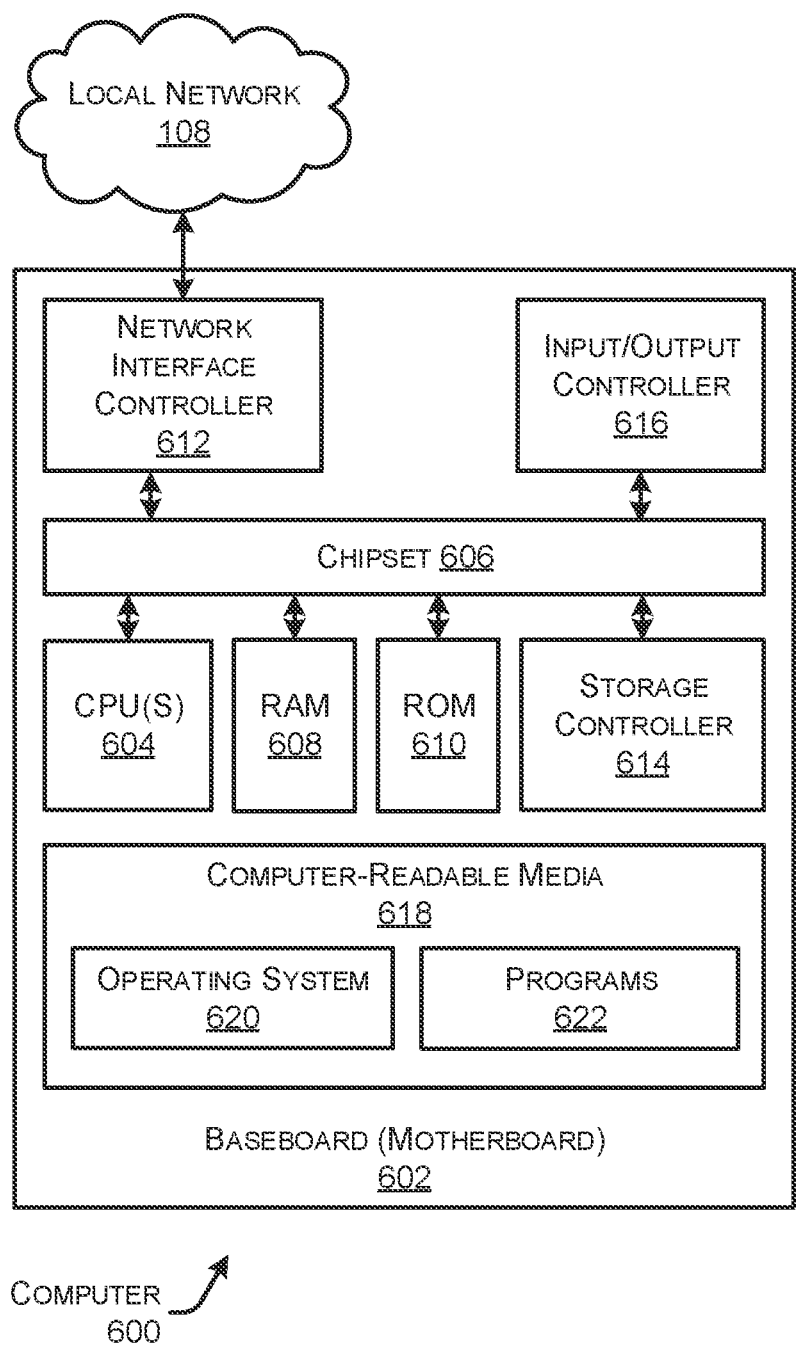
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to an orchestration system 110, an edge device 124, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or nonvolatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as local network 108. The chipset 606 can include functionality for providing network connectivity through a NIC 612, such as a gigabit Ethernet adapter. The NIC 612 is capable of connecting the computer 600 to other computing devices over the local network 108. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the orchestration system 110, the edge device 124, and/or any components included therein, may be supported by one or more devices similar to computer 600. Stated otherwise, some or all of the operations performed by the orchestration system 110, the edge device 124, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of an orchestration system 110, an edge device 124, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the orchestration system 110, the edge device 124, and/or any other device. The network interfaces may include devices configured to couple to personal area networks (PANs), wired and wireless local area networks (LANs), wired and wireless wide area networks (WANs), and so forth. For example, the network interfaces may, include devices compatible with Ethernet, and so forth.

The programs 622 may comprise any type of programs or processes to perform the techniques described in this disclosure for monitoring and authorizing clock synchronization between devices of a network. For instance, the programs 622 may cause the computer 600 to perform techniques for efficiently partitioning and distributing a deep neural network to edge device(s) in a network, including: identifying a neural network model configured to process data generated by a computing device in a network; analyzing the neural network model to determine a location in the neural network model at which to split the neural network model; identifying a first computing device in the network at which to run a first workload associated with a first portion of the neural network model; identifying a second computing device in the network at which to run a second workload associated with a second portion of the neural network model; splitting the neural network model at the location; deploying the first workload to the first computing device;

and deploying the second workload to the second computing device. In this way, an orchestration system can optimally split a neural network model into several pieces, with each piece small enough to fit available compute resources at the edge without compromising on the performance, while providing better data security, and optimizing throughput of the neural network model. Moreover, users are enabled to split heavy neural network workloads into multiple parts, enabling the user to process the workload on a set of smaller, less capable compute nodes in a distributed manner without compromising on the performance while meeting service level objectives (SLO). Accordingly, by optimizing throughput of the neural network model and providing improved data security, a user may run a large and comprehensive AI model at the edge without the need to invest into additional, dedicated hardware, thereby decreasing costs associated with the system. Additionally, the programs 622 may comprise instructions that cause the computer 600 to perform the specific techniques for efficiently partitioning and distributing a deep neural network to edge device(s) in a network While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of optimized placement of workloads at an edge of a network, the method comprising:
   identifying, by an orchestration system of the network, a model configured to process data generated by a computing device in the network;
   determining, by the orchestration system of the network, one or more locations in the model at which to split the model the one or more locations being associated with optimized execution of the model;
   identifying, by the orchestration system of the network, a first computing device at the edge of the network that is optimized to execute a first workload comprising a first portion of the model;
   identifying, by the orchestration system of the network, a second computing device at the edge of the network that is optimized to execute a second workload comprising a second portion of the model;
   generating, by the orchestration system and based on splitting the model at a location of the one or more locations, the first workload and the second workload;
   deploying, based on packaging the first workload, the first workload to the first computing device to enable the first computing device to execute the first portion of the model; and
   deploying, based on packaging the second workload, the second workload to the second computing device, to enable the second computing device to execute the second portion of the model.

2. The method of claim 1, further comprising:
   determining, based at least partly on monitoring the first computing device, that an event occurs that results in a deteriorated performance of the first computing device;
   identifying a third computing device at which to run the first workload associated with the first portion of the model; and
   deploying the first workload to the third computing device.

3. The method of claim 2, wherein the event comprises one of a CPU overload or a disconnect from the network.

4. The method of claim 1, wherein generating the first workload comprises packaging the first workload in a container configured to execute on a local area network via an execution model.

5. The method of claim 1, wherein the model comprises a deep learning neural network.

6. The method of claim 1, wherein determining the one or more locations includes generating an application graph of the model that identifies one or more potential split locations between one or more layers of the model based on a topology of the model.

7. The method of claim 1, wherein identifying the first computing device includes at least one of:
   determining that an amount of central processing unit (CPU) available on the first computing device is sufficient to support the first workload; or
   determining that an amount of bandwidth available to the first computing device is sufficient to receive data over the network to support the first workload.

8. The method of claim 1, wherein identifying the first computing device is based at least in part on determining that a processor type or device type associated with the first computing device is optimized for running the first workload.

9. A system comprising:
   one or more processors; and
   one or more non-transitory computer-readable media storing computer-executable instructions that, when executed by the one or more processors, cause the one or more processors to perform operations comprising:
      receiving, from a first computing device in a network, a model configured to process data generated by the first computing device in the network;
      determining, a location in the model at which to split the model to optimize throughput of the network;
      determining, based on the location and the model, a second computing device at an edge of in the network optimized to execute a first workload associated with a first portion of the model;
      determining, based on the location and the model, a third computing device at the edge of the network optimized to execute a second workload associated with a second portion of the model;
      generating, based on splitting the model at the location, the first workload and the second workload;
      deploying the first workload to the first computing device at the edge; and
      deploying the second workload to the second computing device at the edge.

10. The system of claim 9, the operations further comprising:
   determining, based at least in part on monitoring the second computing device, that an event occurs that results in a deteriorated performance of the second computing device;

identifying a fourth computing device at which to run the first workload associated with the first portion of the model; and deploying the first workload to the fourth computing device.

11. The system of claim 10, wherein the event comprises one of a CPU overload or a disconnect from the network.

12. The system of claim 10, wherein generating the first workload comprises packaging the first workload in a container configured to execute on a local area network via an execution model.

13. The system of claim 9, wherein the model comprises a deep learning neural network.

14. The system of claim 9, wherein determining the location includes generating an application graph of the model that identifies a split location between one or more layers of the model and is based on a topology of the model, the split location being associated with optimizing the throughput of the network.

15. The system of claim 9, wherein determining the second computing device or the third computing device is based at least in part on:

determining that an amount of central processing unit (CPU) available on the second computing device is sufficient to support the first workload; or determining that an amount of bandwidth available to the second computing device is sufficient to receive data over the network to support the first workload.

16. The system of claim 9, wherein determining the second computing device is based at least in part on determining that a processor type or device type associated with the second computing device is optimized for running the first workload.

17. One or more non-transitory computer-readable media storing computer-readable instructions that, when executed by one or more processors, cause the one or more processors to perform operations comprising:

identifying, based on monitoring a network, a model configured to process data generated by a computing device in the network;

determining, a location in the model at which to split the model to optimize throughput of the network;

determining, based on the location and the model, a first computing device at an edge of the network optimized to execute a first workload associated with a first portion of the model;

determining, based on the location and the model, a second computing device at the edge of the network optimized to execute a second workload associated with a second portion of the model;

generating, based on splitting the model at the location, the first workload and the second workload;

deploying the first workload to the first computing device at the edge; and deploying the second workload to the second computing device at the edge.

18. The one or more non-transitory computer-readable media of claim 17, the operations further comprising:

determining, based at least in part on monitoring the first computing device, that an event occurs that results in a deteriorated performance of the first computing device;

identifying a third computing device at which to run the first workload associated with the first portion of the model; and deploying the first workload to the third computing device.

19. The one or more non-transitory computer-readable media of claim 18, wherein the event comprises one of a CPU overload or a disconnect from the network.

20. The one or more non-transitory computer-readable media of claim 18, wherein determining the location includes generating an application graph of the model that identifies a split location between one or more layers of the model based on a topology of the model, the split location being associated with optimizing the throughput of the network.

* * * * *